United States Patent [19]

Duhl

[11] 4,277,527
[45] Jul. 7, 1981

[54] WALL CONSTRUCTION MATERIAL COMPRISING A RIGID SUPPORT WITH A TEXTILE MATERIAL FACING LAMINATED THERETO

[75] Inventor: Daniel Duhl, New York, N.Y.

[73] Assignee: Polylok Corporation, New York, N.Y.

[21] Appl. No.: 82,324

[22] Filed: Oct. 5, 1979

Related U.S. Application Data

[63] Continuation-in-part of Ser. No. 838,889, Oct. 3, 1977, and Ser. No. 3,361, Jan. 15, 1979.

[51] Int. Cl.³ .................. B32B 5/08; B32B 5/12; B32B 5/26; B32B 13/14; B32B 21/10
[52] U.S. Cl. ........................ 428/109; 66/190; 66/191; 66/192; 66/193; 428/232; 428/246; 428/247; 428/246; 428/537
[58] Field of Search ............ 428/109, 232, 246, 247, 428/296, 537, 538

[56] References Cited

U.S. PATENT DOCUMENTS

| | | | |
|---|---|---|---|
| 3,672,187 | 6/1972 | Simpson | 66/192 |
| 3,677,034 | 7/1972 | Simpson | 66/84 |
| 3,724,156 | 4/1973 | Helmerson | 428/538 |
| 3,755,051 | 8/1973 | Stumpf | 428/89 |
| 3,920,872 | 11/1975 | Ollinger | 428/96 |
| 3,935,049 | 1/1976 | Schmidt et al. | 428/538 |
| 3,940,541 | 2/1976 | Kanatsu et al. | 428/538 |
| 3,962,510 | 6/1976 | Worcester et al. | 428/296 |
| 4,144,727 | 3/1979 | Duhl et al. | 66/192 |
| 4,181,767 | 1/1980 | Steinau | 428/296 |

*Primary Examiner*—James C. Cannon
*Attorney, Agent, or Firm*—Pennie & Edmonds

[57] ABSTRACT

A laminated structure for use in wall construction is disclosed which comprises a rigid support and an integrally self-lined textile material having a front surface and a rear surface and adhesively bonded on its rear surface to the rigid support. The textile material comprises, in one embodiment, (i) a nonwoven spun fibrous batting constituting the rear surface of the textile material and capable of being stitched-through without substantial loss of strength by knitting thread; (ii) a layer of filling disposed upon the batting; (iii) one or more warp elements disposed upon the filling so as to constitute the front surface of the textile material; and (iv) a single system of knitting thread wales, each wale comprising a multiplicity of warpwise looped stitch courses which engage and hold together the batting, filling and warp elements into an integrated unitary textile structure.

20 Claims, 6 Drawing Figures

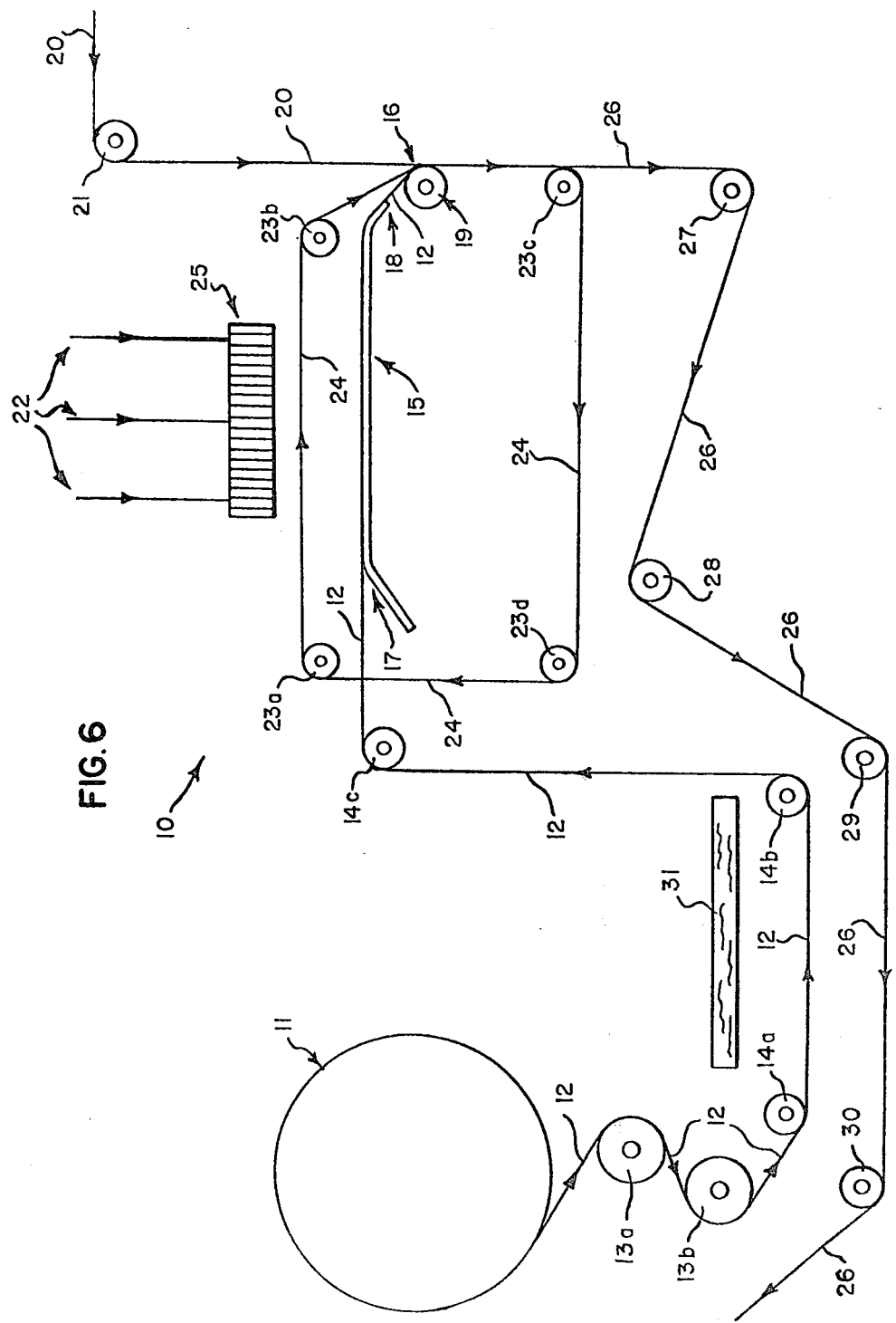

WALL CONSTRUCTION MATERIAL COMPRISING A RIGID SUPPORT WITH A TEXTILE MATERIAL FACING LAMINATED THERETO

DESCRIPTION

Cross-Reference to Related Applications

This is a continuation-in-part of application Ser. No. 838,889 filed Oct. 3, 1977 and of application Ser. No. 003,361 filed Jan. 15, 1979.

TECHNICAL FIELD

This invention relates to the building construction art, and more particularly to those aspects of the building and home construction and decorating fields having to do with interior wall and surface materials.

The invention also relates to a novel concept of a laminated wall structure derived from unitary non-woven textile materials of unique functional and aesthetic design. These textile materials are produced on stitch-through type machines such as a Malimo machine wherein the material is self-lined by one of its own components.

BACKGROUND ART

Modern home and building construction and decorating techniques have been increasingly directed toward the use of ornamental coverings on pre-existing interior surfaces, e.g., plaster walls and partitions. To achieve the desired decorative effects, the surface to be treated is usually painted or otherwise covered, e.g., with wallpaper.

Among the various decorative coverings that can be applied to wall surfaces, fabric coverings are the most luxurious and the most generally sought-after by fastidious architects and interior decorators and their clientele. However, the high cost of specialty fabrics heretofore employed for wall coverings, coupled with the great skill needed to properly install them on wall surfaces, has raised the price of fabric-covered walls beyond the reach of consumers who would otherwise want them in their homes and offices.

A need has therefore existed for a way of providing fabric-covered walls using more affordable materials and techniques than were heretofore available.

Accordingly, it is an object of the present invention to provide fabric-covered walls made of low-cost materials and which can be readily produced.

Another object is to provide convenient methods for producing fabric-covered walls from low-cost materials and techniques.

Yet another object is to provide materials for producing fabric-covered walls, which materials are both low in cost and provide convenient methods for producing fabric-covered walls.

These and other objects of the invention as well as a fuller understanding of the features and advantages thereof can be had by reference to the following detailed description, drawings and claims.

DISCLOSURE OF INVENTION

The foregoing objects are achieved according the present invention through a new concept in building and home construction involving a novel article of manufacture, denominated herein as a fabric board. The fabric board of this invention is a pre-fabricated laminated structure comprising a rigid support to the surface of which is adhered a unitary non-woven textile material having certain specific functional features described hereinbelow. In use, the fabric board, which can be conveniently provided in, say, four-by-eight foot panels, can be readily installed without the need for special tools or techniques, e.g., by fastening it to studs suitably spaced according to local building codes.

The fabric board laminated structure of the invention achieves a very attractive and heretofore unattainable combination of economy of materials, ease of production and installation, functional utility, and decorative visual effect of aesthetically pleasing appearance through the unique placement of a functional lining integral with the textile material. In this way, the "self-liner" performs its critical function as a barrier, described in greater detail hereinbelow, without interfering with the unity of the other elements of the textile material or obstructing the decorative visual effect.

The rigid support can be any planar or non-planar board-like material capable of being adhesively laminated to the aforesaid textile material, such as but not limited to wallboard, a term recognized and accepted in the building, architectural and interior decorating trades as a general classification applicable to board-like materials suitable for use in or on walls, ceilings and/or floors, including organic wallboard (e.g., hardboard, particleboard, insulating board, plywood), inorganic-organic wallboard (i.e., gypsum board, mineral board, wood-inorganic binderboard), and inorganic wallboard (e.g., asbestos-cement, ceramic board). Among the more commonly used wallboard materials suitable for use according to the present invention are "Masonite" hardboard (Masonite Corporation), "Novaply" particleboard (U.S. Plywood), "Celotex" insulating board (Celotex Corp. and U.S. Gypsum), and "Sheetrock" gypsum board (U.S. Gypsum). These wallboard materials are described in greater detail in Kirk-Othmer's "Encyclopedia of Chemical Technology", 2nd ed., vol. 21, pp. 601–25 (1970). Other rigid support materials usable within the scope of the invention will be apparent to those skilled in the art having the benefit of the present disclosure before them.

The textile material is flat-knitted, integrally self-lined and typically composed of an initially flexible non-woven spun fibrous batting as a lining material or self-liner; an optional initially flexible filling or interstratum, e.g., of filling yarns, laid on the lining material from selvage to selvage; one or more optional textile warp elements laid on the filling (or, in the absence of a filling, on the lining material) in the general warpwise or machine (i.e., longitudinal) direction; and a single system of parallel knitting thread wales across the width of the textile material forming a multiplicity of warpwise looped stitch courses whose loops engage and hold together the self-liner, optional filling and optional warp element(s) by loops of knitting thread on the rear surface of the textile material and by laps of the knitting thread courses on the front surface to bind together the aforesaid components into an integrated unitary textile structure, and to secure them against relative displacement. In cases where a more or less "open mesh" or "home spun" appearance is sought, this can be achieved by controlling the spacing between individual warp elements and, where the filling is a layer of textile yarn filling elements, by controlling also the spacing between the individual filling yars. This and other "stitch-through" type fabric structures can be obtained on various machines, including those of the "Malimo" type, using methods and equipment described in U.S. Pat. Nos. 2,890,579; 3,030,786; 3,253,426; 3,274,806; 3,279,221; 3,309,900; 3,389,583; 3,392,078; 3,440,840; 3,452,561; 3,457,738; 3,460,599; 3,540,238; 3,541,812; 3,567,565; 3,592,025; and U.S. Pat. No. Re. 25,749.

Although the need for the present invention was prompted largely by the rapidly rising cost of conventional fabric wall coverings and the skilled labor required to install them, its discovery and significant utilitarian advantages were made possible at least in part by the barrier properties toward fluid adhesives which the textile material component of the fabric board critically exhibits during the manufacturing process as compared to conventional wall covering fabrics. These barrier properties of the textile material are achieved according to the present invention by the use of a flexible self-liner, which is an integral part of the textile material, in the form of a layer of non-woven spun-bonded or spun-laced fibrous batting and by particular placement of the self-liner behind or beneath the filling and/or warp elements. In this way, the self-liner performs its barrier function during the manufacturing process without subsequently interfering with the unity of warp and filling or obstructing the decorative effect thereof in the final laminated structure product. Such lining materials have been discovered to be not only capable of being stitched-through by knitting-thread without substantial loss of strength and secured thereby to the overlying filling and warp elements, but are also to capable of being back-coated with a layer of fluid adhesive without allowing the fluid to penetrate through to the front surface of the textile material, and notwithstanding the diaphanous quality of the textile material resulting from the open spacing between the filling and warp elements. Preferred self-liners possessing such "barrier properties" include continuous filament and staple filament battings and spread tow, in which the self-liner is a continuous sheet material in the form randomly arranged highly dispersed continuous filaments, e.g., spun-bonded continuous filament polyester sold by E. I. du Pont de Nemours & Co. under the trademark "Reemay", and entangled staple fiber, e.g., spun-laced polyester staple sold by du Pont under the trademark "Sontara". As indicated above, these liners can be and are back-coated with adhesive compositions for bonding the rear surface of the textile material to the surface of the rigid support panel. Other materials suitable for use as the self-liner of the textile material will be apparent to those skilled in the art upon appreciation of the present disclosure.

The filling upon which the warp elements are laid in forming the textile material component of the laminated structure can be pre-knitted (e.g., tricot) or pre-woven fabric, fibrous batting or any other continuous sheeting; one or more layers of textile filling elements (e.g., yarns) running in a general weft-wise direction with respect to the warp elements, or any other flexible structure capable of being secured to the self-liner and warp elements with knitting thread according to procedures familiar to those skilled in the stitch-through fabric construction art. In the case of fabric board having the open-mesh "home spun" appearance, a filling in the form of a layer of more or less spaced-apart textile filling yarns or elements is preferred. In the case where the filling is other than yarn, e.g., continuous sheet material, a fabric board is obtained whose textile component in effect has two linings.

The warp elements suitable for use in the present invention include, but are not limited to, any of those elements heretofore used in stitch-through fabric construction. Exemplary of such warp elements are yarns, such as multifilament figure yarns, multifilament low twist crimped yarns, taslanized (air-entagled) yarns, spiral yarns consisting of low twist spun yarns combined with a fine binder yarn; and/or ribbons, such as fabric, batting, or felted ribbons.

The warp elements, when employed in the present fabric board construction can be laid on the filling and/or self-liner in either mutually contacting relationship or can be spaced apart from one another at any predetermined distance. Desirably, but without wishing to so limit the scope of the invention, such warp elements are substantially spaced apart in order to amplify and enhance the visual effect of the "open-weave look" characteristic of fabrics produced in stitch-through type machines. The warp elements can be laid on the filling and/or on the self-liner in a substantially rectilinear or straight line fashion parallel to the warp direction. Alternatively, one or more warp or "design" elements (so called because of the aesthetically pleasing appearance and ornamental effect which they impart to the fabric) can be caused to follow non-rectilinear paths along the warp direction, either as described in U.S. Pat. No. 3,672,187, particularly at column 1, line 31 through column 3, line 44 and U.S. Pat. No. 3,677,034, particularly at column 1, line 44 through column 8, line 22 and/or such that a portion of a single warp end is laid down substantially perpendicular to the longitudinal direction of the fabric whereby said portion can be caused to simulate the appearance of filling yarn as described in co-pending commonly assigned Ser. No. 081,191, filed Oct. 2, 1979, and/or in a twisted configuration in the manner disclosed in applicant's U.S. Pat. No. 4,144,727 which foregoing disclosures are incorporated herein by reference. For instance, such warp design elements can included portions of substantial length extending diagonally, relative to the warp direction, along straight lines or curving substantially uniformly. The design elements can be disposed in groups composed of two or more adjacent elements following a substantially identical pattern. Alternatively, adjacent design elements can be laid on the flexible substrate to form different patterns, e.g., wherein they form the same pattern but one is reversed relative to the other.

The knitting thread used to bind together the warp elements, filling, and lining material can be any thread of yarn suitable for use in stitch-through fabric construction and is applied to the aforesaid components by means of the mechanical stitching elements conventionally employed on stitch-through-type machines. Such stitching elements and their mode of operation are well-known to those skilled in the art and include a comb-like sinker bar and comb-like retainer pin bar, which together define an elongated space or work zone for fabric formation between them. The stitching elements include additionally a row of pronged or bearded pointed needles and corresponding closing wires the combination of which is caused to move in a reciprocating fashion through the aforesaid work zone in coaction with a row of knitting thread guides for forming a single knitting thread system comprising a multiplicity of warpwise knitting thread loop chains or wales to bind together the self-liner, filling, and warp elements, with the loops appearing on the rear surface of the resultant composite textile material. In one mode of operation of the machine, alternate loops in each wale are formed with a different knitting thread, and each thread forms a series of warpwise loop chain courses. The loop chains formed can be any type familiar to those skilled in the art, although loop chains of the type characteristic of the well-known half-tricot stitch configuration are preferred when the fabric includes warp elements because of the normally greater structural integrity imparted to the overall fabric by the half-tricot stitch knitting thread network. In such case the fabric components are engaged and held together by the loops of knitting thread on the rear side or surface of the textile material and by laps of the knitting thread courses on the front surface by which the diagonal segment formed by the knitting thread holds the warp, filling, and self-liner together. In this way the warp elements are "lapped" by the knitting thread around the filling and self-liner to achieve an integrated unitary textile structure. In cases where the textile material contains only filling (e.g., an outer surface layer of textile filling yarn elements) and self-liner, the knitting thread can be employed in either the half-tricot or single-end chain stitch configuration to achieve acceptable structural integrity with the loops on the exposed rear surface of the lining. In cases where it is desired to impart an aesthetically pleasing "lofted" or "loose look" to the warp elements and/or increased stability to the textile material against undesirable unzippering or unravelling of the knitting thread network and resultant running or lifting off of the warp elements from the surface of the textile material, it is advantageous to employ a single needle guide bar lock stitch knitting thread construction described in detail in applicant's copending and commonly assigned application Ser. No. 033,181 filed Apr. 26, 1979. In addition to the knitting thread configurations described above, the scope of the present invention includes fabric board having a textile material component in which the knitting thread network is in the form of a three-needle atlas stitch configuration whereby the aforementioned design and functional concepts can be realized.

Other embodiments of the invention include fabric board whose self-lined textile component has warp elements, but no filling, in which case the knitting threads binds the warp elements directly to the self-liner, preferably in a half-tricot stitch configuration, or in cases where the warp elements are laid down in non-rectinlinear paths and the aforementioned lofted appearance in the warp elements is desired, in a chain stitch configuration.

The textile material component of the fabric board of the present invention employing knitting thread to bind the warp elements and the fill yarns into an integrated structure can have the feature in which the knitting thread pierces the individual warp elements and pierces the individual filling yarns at a substantial number of random points to further secure the filling and warp elements against relative displacement.

The laminated structure of the present invention is made possible by a method of forming the textile material component utilizing a novel apparatus in conjunction with stitch-through type machines. The apparatus performs the function of continuously supplying and guiding the lining material to the work zone of the stitch-through machine such that the filling is laid on top of the lining material and the warp elements are laid on top of the filling, and all three components are secured together by knitting thread to form an integral textile structure in a continuous single-stage operation.

In its essential features the apparatus comprises, in combination, means for continuously supplying lining material to the stitch-through machine, means for continuously withdrawing lining material from the supply means, and means for continuously guiding the material to the work zone of the machine independently of the other fabric components and applying the material to the filling and/or warp elements so that the self-liner is disposed beneath them.

In one embodiment of the textile component-forming apparatus, the means for supplying the lining material to the machine is a supply roll or beam of said material, the means for withdrawing the lining material from the supply means comprises two or more driven feed rolls, and the means for independently supporting and guiding the withdrawn lining material to the work zone of the machine and applying said material to the filling and warp elements comprises a smooth slide plate, e.g., of polished metal such as brass or stainless steel, disposed upstream from the work zone of the machine and adapted to receive the lining material in sliding contact therewith and to direct said material to the work zone at a point such that the material is applied beneath the filling and warp elements in one continuous operation.

In its broad aspect, the textile material component of the laminated structure of the present invention can be produced on a stitch-through machine, e.g., a Malimo-type stitch-through machine, by the steps of (a) delivering a flexible self-liner to the above-described elongated work zone of the stitch-through type machine in the manner aforesaid; (b) delivering the optional filling to the work zone conjointly with and in superimposed relation to the lining material; and (c) delivering one or more optional warp elements to the work zone conjointly with and in superimposed relation to the lining material and filling; and (d) binding together the superimposed lining material, filling and warp element(s) at the work zone of the machine by warpwise wales of knitting thread loop chains to form an integrated structure which is the textile component of the fabric board laminated structure of the present invention in greige form, and as such is suitable for further processing according to art-recognized procedures, e.g., dyeing, drying, resinating, and the like.

It is a feature of the foregoing apparatus and method that the lining material is preferably delivered to the work zone of the stitch-through machine independently of the fill component. In this way, it has been discovered that each of the fabric components can better adjust itself to the forces exerted by the stitching elements without mutual distortion. Whereas conventional wisdom suggests applying the lining material to the filling hooks of the machine followed by overlaying the filling onto the same hooks as a means of delivering these two components to the work zone of the machine, such an approach has in fact been found to tend to result in distortion of the assembled fabric.

A further, non-limiting feature of the method for forming the textile component of the laminated structure is that it can be carried out in the manner described above while at the same time guiding the warp "design" elements back-and-forth in a direction substantially parallel to the rows of stitching elements, thereby causing each design element to move back-and-forth within the elongated work zone past a plurality of needles. Equipment and procedures for imparting this additional design feature to the fabric wall panel of the invention are described in the aforementioned U.S. Pat. No.

3,677,034. In using this procedure, the design elements are guided back and forth in reciprocating motion whereby a pattern of design elements is formed on the fabric in which substantial lengths of each design element extend diagonally, relative to the warp direction. For example, the design elements can be guided back and forth at either constant of, more desirably, varying speed, e.g., sinusoidally, so as to form a pattern in which substantial lengths of the design elements are laid on the substrate lengths of the design elements are laid on the substrate in a corresponding straight line or, e.g., in a uniformly curved fashion. In another variant, two groups of design elements can be delivered to the elongated work zone and guided back and forth therein independently or in corresponding phased relation to each other, thereby forming a pattern of design elements on the fabric in which the two groups of design elements form different or substantially identical patterns, respectively. In the former case, one group of design elements can be maintained in phased but opposite relation to the other group, whereby a pattern of design elements is formed in which the two groups of elements form identical patterns, but one is reversed relative to the other. In yet another embodiment, the design elements can be given a periodic "twist" configuration in the manner described in applicant's aforementioned U.S. Pat. No. 4,144,727.

The rigid support and textile material are then laminated or joined together to produce the fabric board of the invention by applying a suitable adhesive between the surface of the rigid support and the rear surface of the textile material and then joining or combining the aforesaid components with application of suitable pressure.

Because of the barrier properties of the self-liner which constitutes the rear surface of the textile material, any of a large variety of adhesives well-known to those skilled in the lamination art can be employed to bond the rigid support to the textile material, including pressure sensitive adhesives applied to the surface of either or both components, and latent adhesives such as a heat- or water-activated adhesive which can be applied, say, to the rear surface of the textile material where it remains as a dry coating until ready for use. See Kirk-Othmer's "Encyclopedia of Chemical Technology", 3rd ed., vol. 1, pp. 488–510 (1978). In cases where it is intended to permit separation of the textile material from the rigid support at a later date, e.g., during the course of interior renovation or redecorating, the adhesive can be selected to permit this operation, which is further facilitated in the case of the present invention by virtue of the integral unitary structure of the textile material component. When joining the rigid support and textile material to form the laminated structure, either or both components can be pre-cut to size. In the case where a component is not cut to size before assembly, the excess can later be trimmed off, e.g., by suitable conventional cutting means.

The decorative textile surface of the thus pre-fabricated fabric board laminated structure can, if desired, be treated with any one or more of a variety of agents for various purposes, such as varnish to achieve a gloss effect, one or more resins to protect the fabric against mechanical injury and abrasion, mildew, fading, etc., soil release agents, and the like.

BRIEF DESCRIPTION OF THE DRAWINGS

Further details of the present invention and its preferred embodiments can be had by reference to the accompanying drawings, wherein corresponding elements are denoted by the same reference numeral:

FIG. 6 is a partially schematic side view of an embodiment of the apparatus suitable for use in forming the textile component of the laminated structure of the invention.

Figure 1:
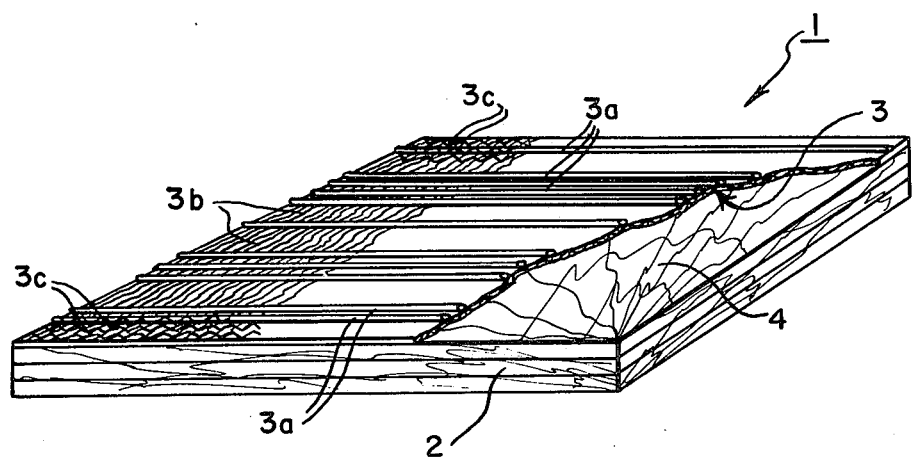
FIG. 1 is a perspective view in partial cutaway of an embodiment of the laminated structure of the present invention.

In the fabric board panel 1 of FIG. 1, self-lined textile material 3 contains decorative warp yarn elements 3a disposed on top of filling yarn elements 3b which in turn are secured by knitting thread network 3c to an underlying layer of nonwoven spun fibrous batting. Textile material 3 is laminated to the support surface 4 of rigid support 2 by means of an adhesive previously applied to the rear surface of the textile material. As already indicated previously, the adhesive can be any of a number of well-known compositions, e.g., a water-activated pressure sensitive adhesive such as wheat starch, or an acrylic adhesive. The support panel depicted in FIG. 1 is a plywood panel, although any of the other aforesaid wallboard materials would be satisfactory. The fabric board 1 itself can be produced to any desired size or shape, although panels 4 feet wide, 8 feet high and about ¼ to 1 inch thick are particularly advantageous since such dimensions correspond to standard wall dimensions normally encountered in the building and home construction, renovation, and interior decorating trades. A particular advantage of the laminated structure resides in the ease and convenience attendant on its installation, since the rigorous requirements for applying the textile material to the rigid support can be accomplished in a mass production manufacturing facility rapidly and under far more rigid quality control conditions then heretofore possible in traditional on-site wall covering installation operations, using conventional fabrics.

Figure 2:
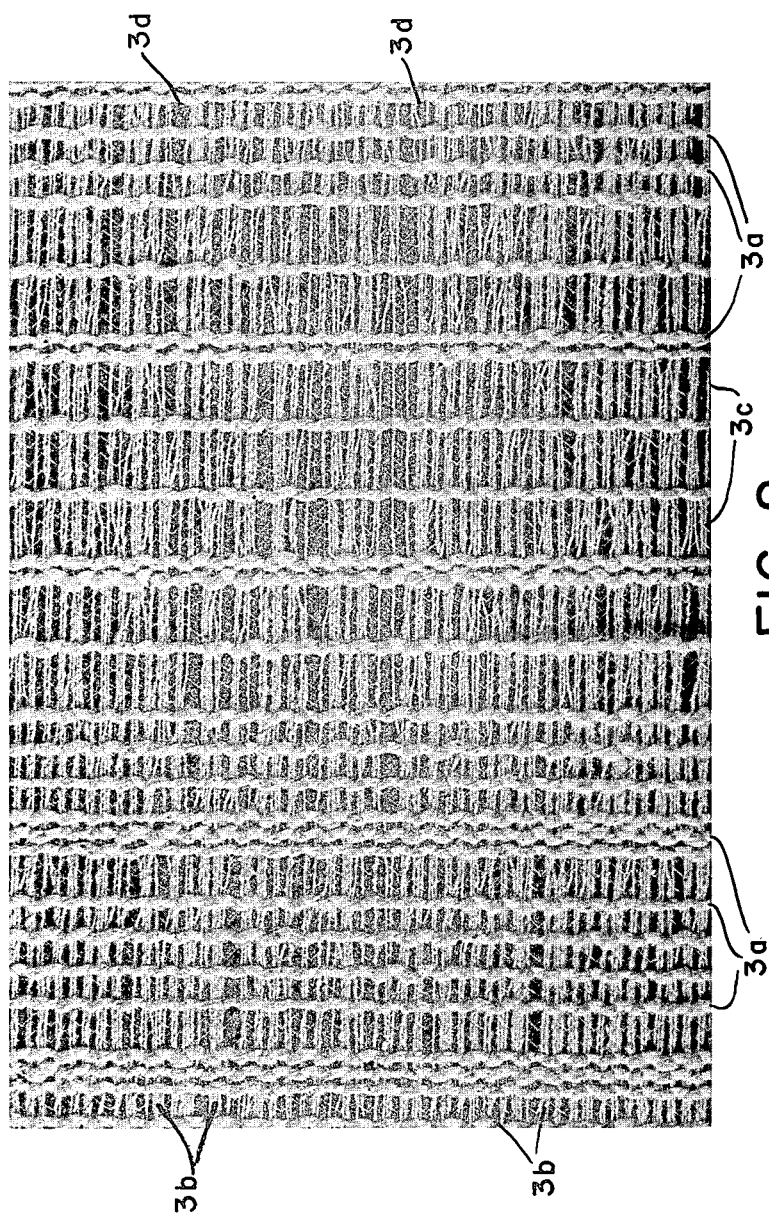
FIG. 2 is a photograph of a portion of the top surface of a self-lined textile material suitable for use as a component of the fabric board laminated structure of the invention and showing the relative disposition of the warp elements, filling and self-liner.
Figure 4:
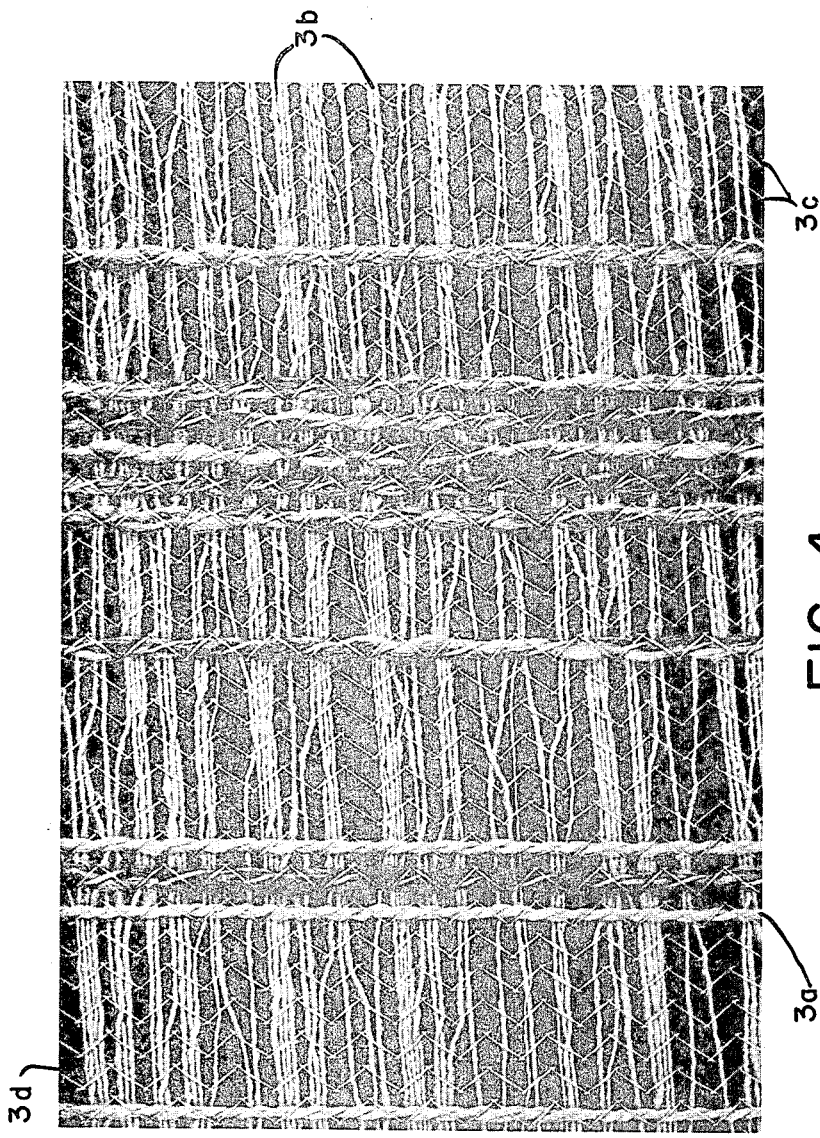
FIG. 4 is a photograph of a portion of the top surface of another self-lined textile material suitable for use as a component of the fabric board laminated structure of the invention which has been back-coated with a latent adhesive.

Referring to FIGS. 2 and 4, warp yarn elements 3a are laid on a flexible filling composed of a layer of spaced-apart textile yarn elements 3b which in turn are laid on a flexible lining material 3d composed of a flexible nonwoven spun fibrous batting to provide a self-lined fabric suitable for use in the present invention. The warp yarn elements 3a, filling yarn elements 3b and lining material 3d are secured in their relative positions by means of knitting threads 3c which form parallel rows of warpwise loop chains with the loops appearing on the rear surface of the fabric, i.e., behind the lining material. The knitting thread 3c shown in FIG. 2 is employed in a half-tricot stitch configuration in which diagonally-extending portions of the knitting thread cross between adjacent loop chains on the front surface of the textile material. Each pair of adjacent loops shares two knitting threads, alternate loops of each chain being part of a first thread and the running loops being from a second thread, to form the half-tricot stitch. Warp yarn elements 3a are also referred to as "design elements" because of the aesthetically pleasing appearance and ornamental effect which they impart to the fabric as a whole, either as shown in FIG. 2, or by virtue of any of a number of non-rectilinear configurations with which they can be applied to the lining material and optional filling as described hereinabove.

Figure 3:
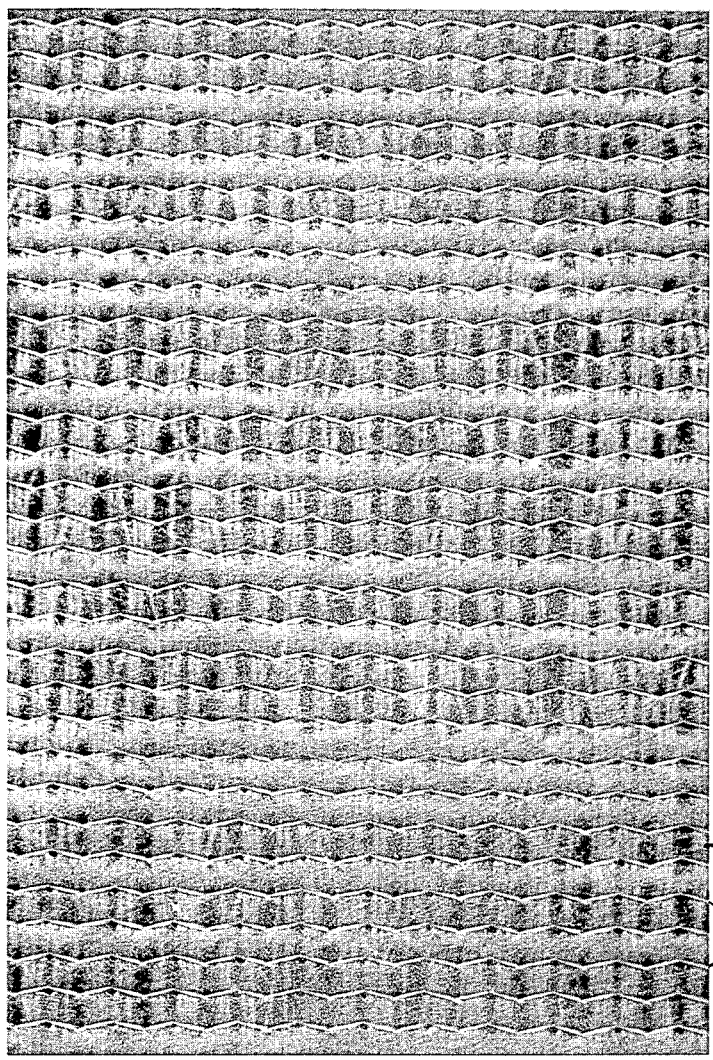
FIG. 3 is a photograph of a portion of the rear surface of the textile material component of FIG. 2.

FIG. 3 shows the manner in which the knitting threads 3c regularly penetrate the lining material 3d at the underside or rear surface of the textile material of FIG. 2 whereby the chain loops of the half-tricot stitch configuration network appear on said rear surface. In this way the warp yarn elements 3a, filling elements 3b and lining material 3d are secured by the knitting threads 3c which lock the three components of the fabric in position relative to one another.

Figure 5:
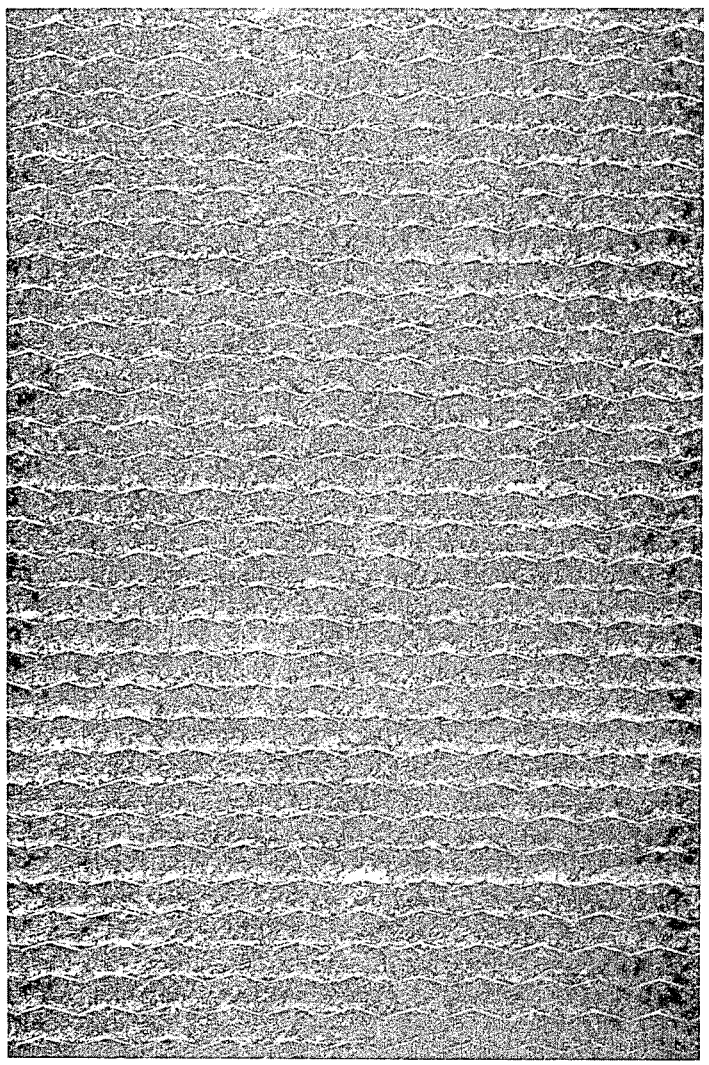
FIG. 5 is a photograph of a portion of the rear surface of the back-coated textile material of FIG. 4.

In fabrics of the type illustrated in FIGS. 2 and 4, the nonwoven spun fibrous batting of lining material 3d is normally employed, in thicknesses corresponding to about 1–6 oz/yd$^2$, which, despite its appealing and unobtrusive gossomer-like quality, is surprisingly capable of accepting an adhesive coating as shown in FIG. 5 without allowing the latter to seep through and mar the decorative appearance of the front surface of the fabric as shown in FIG. 3.

Referring to FIG. 6, there is illustrated an embodiment of the apparatus 10 and method for producing a self-lined textile material suitable for use in the present invention in a stitch-through type machine such as a Malimo machine (partially shown in schematic) wherein the apparatus feeds in lining material between the filling chains under controlled tension in order to form the textile material with warp, filling, and lining material stitch-bonded together in one continuous operation. Beam or roll 11 is adapted to supply lining material 12 to the machine by means of driven feed rolls 13a and 13b which coact to withdraw the lining material from the supply roll. Guide rolls 14a, 14b and 14c serve to govern the pathway followed by the lining material 12 beneath the machine operator's platform 31 and direct the lining material to guide or support plate 15 over which the lining material passes in sliding contact therewith on its way to the work zone or stitching point 16 of the machine independently of the other feed components of the fabric. The entrance end 17 of guide plate 15 is beveled or sloped downward to smoothen the initial contact between the plate and moving lining material. Likewise, the exit end 18 of the guide plate 15 is beveled or sloped downward to direct the traveling lining material 12 toward the work zone of the machine while preventing the lining material from undergoing abrupt changes in direction or contact with abrasive or sharp edges. The guide plate 15 is made of a smooth, wear-resistant material, preferably ceramic or polished metal or steel.

The work zone 16 defines the location where the stitching elements, e.g., sewing needles, closing wires, sewing thread guides, sinker bars and retainer pin bars, coact in mutual synchronization to join the components into an integral textile structure. These stitching elements are denoted by reference numeral 19. The warp yarn feed component is made up of a plane of parallel yarn ends 20 which are supplied to the machine by any convenient means (not shown), e.g., from a beam or creel, and fed to work zone 16 in the direction of the yarn axes by guide roll 21. The filling component is made up of a plane of parallel textile filling yarns or elements 22 which are supplied to the machine from one or more creels (not shown) and fed to work zone 16 in a direction substantially perpendicular to the filling yarn axes by means of a pair of opposed parallel rows of filling hooks, each row being fitted to a chain drive which is driven by rollers 23a, 23b, 23c and 23d on a circular pathway denoted by reference numeral 24. The textile filling elements 22 are applied to the filling hooks by means of filling yarn carrier 25 which comprises a set of reeds mounted on a reciprocating carriage and through which the filling elements pass while the filling carriage moves back and forth between the rows of filling hooks. In cases where the filling is other than a layer of textile filling yarns, the filling hooks can be appropriately modified in a manner which will be apparent to those skilled in the art of stitch-through machines.

It is a feature of the apparatus and method of the invention that the lining material 12 is fed to the work zone 16 of the machine so that the filling elements are disposed between the layer of warp yarn elements and lining material at the point where the fabric components are joined together with knitting thread into an integral textile structure by the stitching elements 19.

The self-lined textile material produced in the work zone of the machine is withdrawn therefrom along the pathway indicated by reference numeral 26 and is directed by means of driven rolls 27, 28, 29 and 30 to an appropriate fabric take-up facility (not shown) for further processing.

The foregoing examples are presented for the purpose illustrating the invention and its advantages without intending to limit the invention in any way to specific features or embodiments. It is understood that changes and variations can be made in the textile material, rigid support, apparatus and method without departing from the scope of the invention which is defined in the following claims.

I claim:

1. A laminated structure for use in wall construction comprising:
   (a) a rigid support having a support surface; and
   (b) an integrally self-lined textile material having a front surface and a rear surface, said material being adhesively bonded on its rear surface to the support surface and comprising:
      (i) a nonwoven spun fibrous batting constituting the rear surface of the textile material;
      (ii) a layer of filling disposed upon the batting;
      (iii) one or more warp elements disposed upon the filling so as to constitute the front surface of the textile material; and
      (iv) a single system of knitting thread wales, each wale comprising a multiplicity of warpwise looped stitch courses which engage and hold together the batting, filling and warp elements by loops of knitting thread on the rear surface of the textile material and by laps of the knitting thread courses on the front surface to bind together into an integrated unitary textile structure the batting, filling, and warp elements.

2. The laminated structure according to claim 1 wherein the nonwoven fibrous batting is composed of spun-bonded continuous filaments.

3. The laminated structure according to claim 1 wherein the nonwoven fibrous batting is composed of spun-laced staple filaments.

4. The laminated structure according to claim 1 wherein the system of knitting thread wales comprises a half-tricot stitch configuration by alternating two threads in a loop series.

5. The laminated structure according to claim 1 wherein said one or more warp elements are disposed along non-rectilinear paths in a warpwise direction, each of said warp elements including portions extending nonparallel to the warpwise direction while providing an aesthetically pleasing appearance corresponding to the non-rectilinear configuration of said warp elements.

6. The laminated structure according to claim 1, 2, 3, 4, or 5 wherein the rigid support is wallboard.

7. The laminated structure according to claim 6 wherein the wallboard is hardboard, particleboard, insulating board, plywood, or gypsum board.

8. A laminated structure for use in wall construction comprising:
   (a) a rigid support having a support surface; and
   (b) an integrally self-lined textile material having a front surface and a rear surface, said textile material being adhesively bonded on its rear surface to the support surface and comprising:
      (i) a nonwoven spun fibrous batting constituting the rear surface of the textile material;
      (ii) a layer of filling disposed upon the batting so as to constitute the front surface of the textile material; and
      (iii) a single system of knitting thread wales, each wale comprising a multiplicity of warpwise looped stitch courses which engage and hold together the batting and filling by loops of knitting thread on the rear surface of the textile material and by laps of the knitting courses on the front surface to bind together into an integrated unitary textile structure the batting and filling.

9. The laminated structure according to claim 8 wherein the nonwoven fibrous batting is composed to spun-bonded continuous filaments.

10. The laminated structure according to claim 8 wherein the nonwoven fibrous batting is composed of spun-laced staple filaments.

11. The laminated structure according to claim 8 wherein the system of knitting thread wales comprises a chain stitch configuration.

12. The laminated structure according to claim 8, 9, 10 or 11 wherein the rigid support is wallboard.

13. The laminated structure according to claim 12 wherein the wallboard is hardboard, particleboard, insulating board, plywood, or gypsum board.

14. A laminated structure for use in wall construction comprising:
   (a) a rigid support having a support surface; and
   (b) an integrally self-lined textile material having a front surface and a rear surface, said textile material being adhesively bonded on its rear surface to the support surface and comprising:
      (i) a nonwoven spun fibrous batting constituting the rear surface of the textile material;
      (ii) one or more warp elements disposed upon the batting so as to constitute the front surface of the textile material; and
      (iii) a single system of knitting thread wales, each wale comprising a multiplicity of warpwise looped stitch courses which engage and hold together the batting and warp elements by loops of knitting thread on the rear surface of the textile material and by laps of the knitting courses on the front surface to bind together into an integrated unitary textile structure the batting and warp elements.

15. The laminated structure according to claim 14 wherein the nonwoven fibrous batting is composed of spun-bonded continuous filaments.

16. The laminated structure according to claim 14 wherein the nonwoven fibrous batting is composed of spun-laced staple filaments.

17. The laminated structure according to claim 14 wherein the system of knitting thread wales comprises a half-tricot stitch configuration by alternating two threads in a loop series.

18. The laminated structure according to claim 14 wherein said one or more warp elements are disposed along non-rectilinear paths in the warpwise direction, each of said warp elements including portions extending non-parallel to the warpwise direction while providing an aesthetically pleasing appearance corresponding to the non-rectilinear configuration of said warp elements.

19. The laminated structure according to claim 14, 15, 16, 17, or 18 wherein the rigid support is wallboard.

20. The laminated structure according to claim 19 wherein the wallboard is hardboard, particleboard, insulating board, plywood, or gypsum board.

* * * * *

UNITED STATES PATENT AND TRADEMARK OFFICE
CERTIFICATE OF CORRECTION

PATENT NO. : 4,277,527

DATED : July 7, 1981

INVENTOR(S) : Daniel Duhl

It is certified that error appears in the above—identified patent and that said Letters Patent is hereby corrected as shown below:

Column 2, line 67, "yars" should read -- yarns -- .
Column 4, line 50, "of yarn" should read -- or yarn -- .

Column 5, line 44, "threads" should read -- thread -- .

Column 5, line 47, "rectinlinear" should read -- rectilinear --

Column 7, line 7, "constant of" should read -- constant or -- .

Column 7, line 10, delete the entire line, viz., "substantial lengths of the design elements are laid on the".

Column 11, line 48, "composed to" should read -- composed of --

Signed and Sealed this

First Day of December 1981

[SEAL]

Attest:

GERALD J. MOSSINGHOFF

Attesting Officer     Commissioner of Patents and Trademarks